United States Patent [19]

Cuypers

[11] Patent Number: 4,929,048
[45] Date of Patent: May 29, 1990

[54] FIBER OPTIC DISPLAY

[75] Inventor: Michel J. Cuypers, Longmont, Colo.

[73] Assignee: Fiberview Corporation, Boulder, Colo.

[21] Appl. No.: 271,234

[22] Filed: Nov. 10, 1988

[51] Int. Cl.$^5$ ............................................. G02B 6/04
[52] U.S. Cl. ............................. 350/96.24; 350/96.22
[58] Field of Search ............... 350/96.24, 96.25, 96.27, 350/96.22, 96.20

[56] References Cited

U.S. PATENT DOCUMENTS

| | | |
|---|---|---|
| 2,979,632 | 4/1961 | MacNeille ............................ 313/89 |
| 3,043,910 | 7/1962 | Hicks, Jr. ............................ 178/7.85 |
| 3,128,167 | 4/1964 | Woodcock ............................ 65/36 |
| 3,141,105 | 7/1964 | Courtney-Pratt ..................... 313/68 |
| 3,190,735 | 6/1965 | Kapany ................................ 65/4 |
| 3,373,006 | 3/1968 | Woodcock ............................ 65/1 |
| 3,402,000 | 9/1968 | Crawford ............................. 350/96 |
| 3,498,864 | 3/1970 | Ogle ................................... 156/242 |
| 3,542,451 | 11/1970 | Washburn ............................ 350/96 |
| 3,554,721 | 1/1971 | Gardner ............................... 65/4 |
| 3,585,705 | 6/1971 | Allan ................................... 29/412 |
| 3,644,922 | 2/1972 | James et al. ........................ 340/324 R |
| 3,717,531 | 2/1973 | Smith .................................. 156/180 |
| 3,853,658 | 12/1974 | Ney ..................................... 156/180 |
| 3,864,034 | 2/1975 | Yevick ................................ 353/120 |
| 3,871,591 | 3/1975 | Murata ................................ 242/18 G |
| 3,909,109 | 9/1975 | Aurenz ................................ 350/96 B |
| 3,954,546 | 5/1976 | Aurenz ................................ 156/433 |
| 4,116,739 | 9/1978 | Glenn .................................. 156/169 |
| 4,173,391 | 11/1979 | Schure et al. ....................... 350/96.25 |
| 4,198,120 | 4/1980 | Norris et al. ........................ 350/96.25 |
| 4,208,096 | 6/1980 | Glenn, Jr. ........................... 350/96.25 |
| 4,364,788 | 12/1982 | Bloodworth, Jr. et al. ......... 156/179 |
| 4,452,623 | 6/1984 | Utsumi et al. ....................... 65/3.12 |
| 4,492,424 | 1/1985 | Clegg .................................. 350/96.24 |
| 4,650,280 | 3/1987 | Sedlmayer ........................... 350/96.27 |
| 4,668,445 | 5/1987 | Calvet et al. ........................ 264/1.5 |
| 4,693,552 | 9/1987 | Jeskey ................................. 350/96.24 |
| 4,762,387 | 8/1988 | Batdorf et al. ...................... 350/96.20 |
| 4,773,730 | 9/1988 | Sedlmayer ........................... 350/96.27 |
| 4,786,139 | 11/1988 | Sedlmayer ........................... 350/96.27 |

FOREIGN PATENT DOCUMENTS 0249934 12/1987 European Pat. Off. .......... 350/96.25

OTHER PUBLICATIONS

IBM Technical Disclosure Bulletin, Aug. 1971, "Manufacturing Matched Fiber Optical Arrays", by D. H. Casler, p. 829.

Primary Examiner—William L. Sikes
Assistant Examiner—Robert E. Wise

[57] ABSTRACT

A fiber optic display includes an array of optical fibers arranged in a matrix having multiple rows, each row having multiple discrete optical fibers. The output ends of the fibers are held in precise registration by a set of spacers. Each spacer defines an array of parallel grooves on one side, and each groove is sized to receive a single respective one of the optical fibers. Each of the grooves is separated by a land having a width, and the optical fibers in each row are laterally separated from one another by a distance no less than the width of the land. The optical fibers are secured in the grooves with no more than one optical fiber in each groove such that the grooves position the optical fibers precisely with respect to one another within each row. The spacers are secured together in aligned registration to form a display surface aligned with the light output ends of the optical fibers, and this display surface is positioned at an acute angle with respect to the grooves.

8 Claims, 5 Drawing Sheets

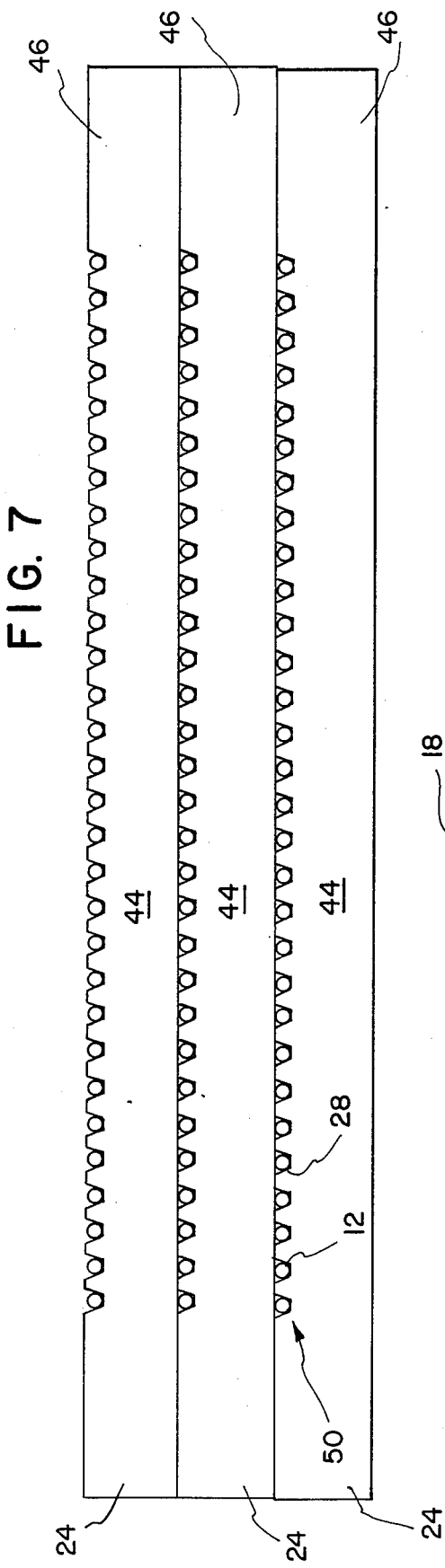
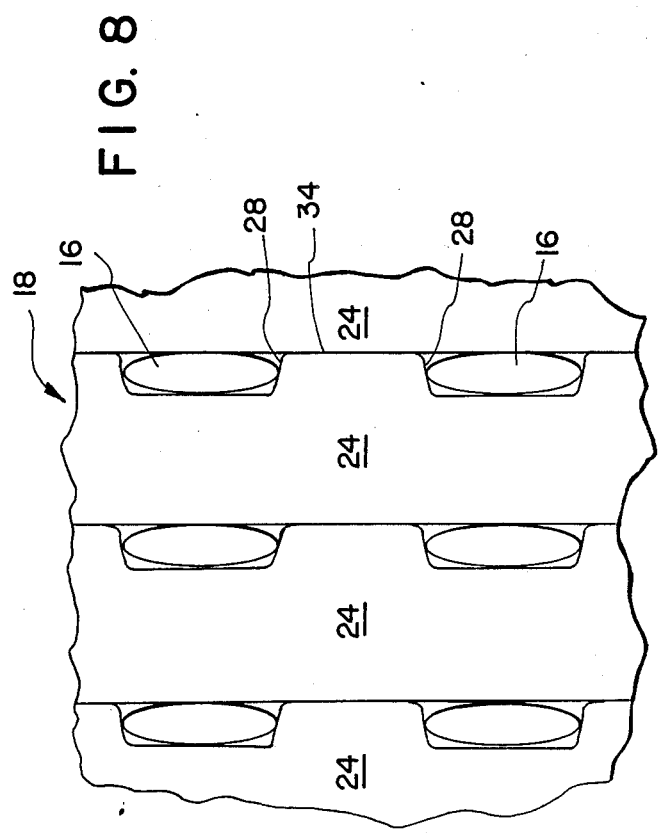

FIBER OPTIC DISPLAY

BACKGROUND OF THE INVENTION

This invention relates to an improved spacer for a fiber optic display, that provides improved control over the position and spacing of individual fibers.

Glenn U.S. Pat. Nos. 4,208,096 and 4,116,739 disclose a method for making fiber optic displays that is well suited for large volume, commercial fabrication of displays. In the Glenn method, optical fibers are spirally wrapped around a core spacer, with each layer of fibers separated by a further spacer. The resulting assembly is then split along an angled cut to form two identical displays on each side of the core spacer. The system disclosed in the Glenn patent uses spacers which do not themselves have guides for positioning the fibers laterally across the spacers. Hicks U.S. Pat. No. 3,043,910 shows another fiber optic display that uses flat spacers 27, as best shown in FIG. 12.

Though the Glenn patents describe an effective method that has been successfully used to make fiber optic displays on a commercial basis, there have been efforts to provide spacers with edge guides for fiber optic ribbons. See Sedlmayr U.S. Pat. No. 4,650,280. As shown in FIG. 5 of the Sedlmayr patent, each spacer defines a trough that receives an entire ribbon made up of fiber optic strands positioned in a closely packed arrangement (see also FIG. 2). This approach is severely limited, because the lateral spacing between individual fibers of the ribbon is determined by the ribbon, and not by the spacer itself. This makes it difficult or impossible to alter the lateral spacing between adjacent fiber optic strands with the spacer.

Aurenz U.S. Pat. No. 3,909,109 discloses a fiber optic display in which individual fibers are bent at right angles in the device (FIG. 2). These fibers are mounted on plates 2, which may have embossing to define the position of the fibers (Col. 3, lines 64–66). However, Aurenz provides no details on such embossing, and the right angle bends in the fibers of Aurenz make the structure shown in Aurenz unsuitable for the Glenn fabrication method.

Of course, there has been considerable activity in the field of guiding optical fibers during fabrication of fiber optic devices. Note for example the troughs for receiving rows of closely packed fibers shown in FIG. 11 of James U.S. Pat. No. 3,644,922 and FIGS. 12 and 13 of Yevick U.S. Pat. No. 3,864,034. See also the plates or screens with apertures for individual fibers in Smith U.S. Pat. No. 3,717,531 and Ney U.S. Pat. No. 3,853,658. Comb guides have been used to position individual fibers, as shown in Aurenz U.S. Pat. No. 3,954,546 and Murata U.S. Pat. No. 3,871,591. In a somewhat similar fashion, guides have been provided to separate individual fibers in a cable (Washburn U.S. Pat. No. 3,542,451 and Bloodworth U.S. Pat. No. 4,364,788). Finally, Courtney-Pratt U.S. Pat. No. 3,141,105 and Ogle U.S. Pat. No. 3,498,864 take an entirely different approach by substituting molded arrays of light guides for individual strands that are assembled as described in the Glenn patents.

In spite of the high level of activity in this field, none of the patents discussed above suggests a system for positioning each individual fiber precisely and individually in a display that can be manufactured using the highly advantageous Glenn method.

SUMMARY OF THE INVENTION

This invention relates to an improvement in a fiber optic display of the type that comprises an array of discrete optical fibers arranged in a matrix having a plurality of rows, each row having a plurality of optical fibers, wherein the array of optical fibers has a light input end and a light output end. According to this invention, a plurality of spacers is provided, each spacer defining an array of parallel grooves on one side thereof, each of said grooves sized to receive a respective one of the optical fibers. Each of the grooves is separated by a land having a width such that adjacent optical fibers in each row are laterally separated from one another by a distance no less than the width of the respective land. The optical fibers are secured in the grooves with no more than one optical fiber in each groove such that the grooves position the optical fibers precisely with respect to one another within each row. The spacers are secured together in aligned registration to form a surface such as a display surface aligned with selected ends such as the light output ends of the optical fibers. This surface is positioned at an acute angle with respect to the grooves such that the ends at the surface are elongated in a direction extending along the rows.

The spacer of this invention provides significant advantages. In particular, the individual grooves allow the spacing between individual fibers to be controlled within a row, as well as between rows. Also, fiber diameter may be selected independently of fiber spacing. These factors provide an important dimension of design flexibility. Furthermore, the individual grooves prevent tangling or squirreling of fibers throughout the region of contact between the fibers and the spacers.

Because each of the fibers is individually channelled and positioned by the respective groove, fiber alignment is not limited by the precision with which a ribbon of closely packed fibers can be made. Individual fibers vary to some extent from one another in diameter, and in a ribbon of closely packed fibers such variations can result in cumulative errors that misposition a fiber significantly. The grooves of the spacer of the present invention can however be positioned precisely, each with respect to a reference position. For this reason, the spacer of this invention is well adapted to avoid accumulated errors that may misposition a fiber.

The spacer of this invention provides further advantages in that it is well adapted to automatic fabrication techniques. This spacer can be used in the Glenn fabrication method described above, as well as in other automatic methods such as those using pick and place machines to place individual fiber optic strands in the grooves of the spacers. Because the spacer of this invention is well suited to be cut at an acute angle to provide two display surfaces as described in detail below, the excellent brightness and the wide viewing angles associated with such angle cuts can both be obtained. The spacer of this invention can readily be injection molded, and it can be stacked in an automatic process to build up large display surfaces. Furthermore, the spacer of this invention completely eliminates the need for prefabricated ribbons, and the costs associated with such prefabrication.

The invention itself, together with further objects and attendant advantages, will best be understood by reference to the following detailed description, taken in conjunction with the accompanying drawings.

BRIEF DESCRIPTION OF THE DRAWINGS

FIG. 7 is a view corresponding to FIG. 3 showing a plurality of the spacers of FIG. 3 stacked one above another during fabrication.

FIG. 8 is an enlarged view of the display surface of the embodiment of FIG. 1 taken along line 8—8 of FIG. 1.

DETAILED DESCRIPTION OF THE PRESENTLY PREFERRED EMBODIMENTS

Figure 1:
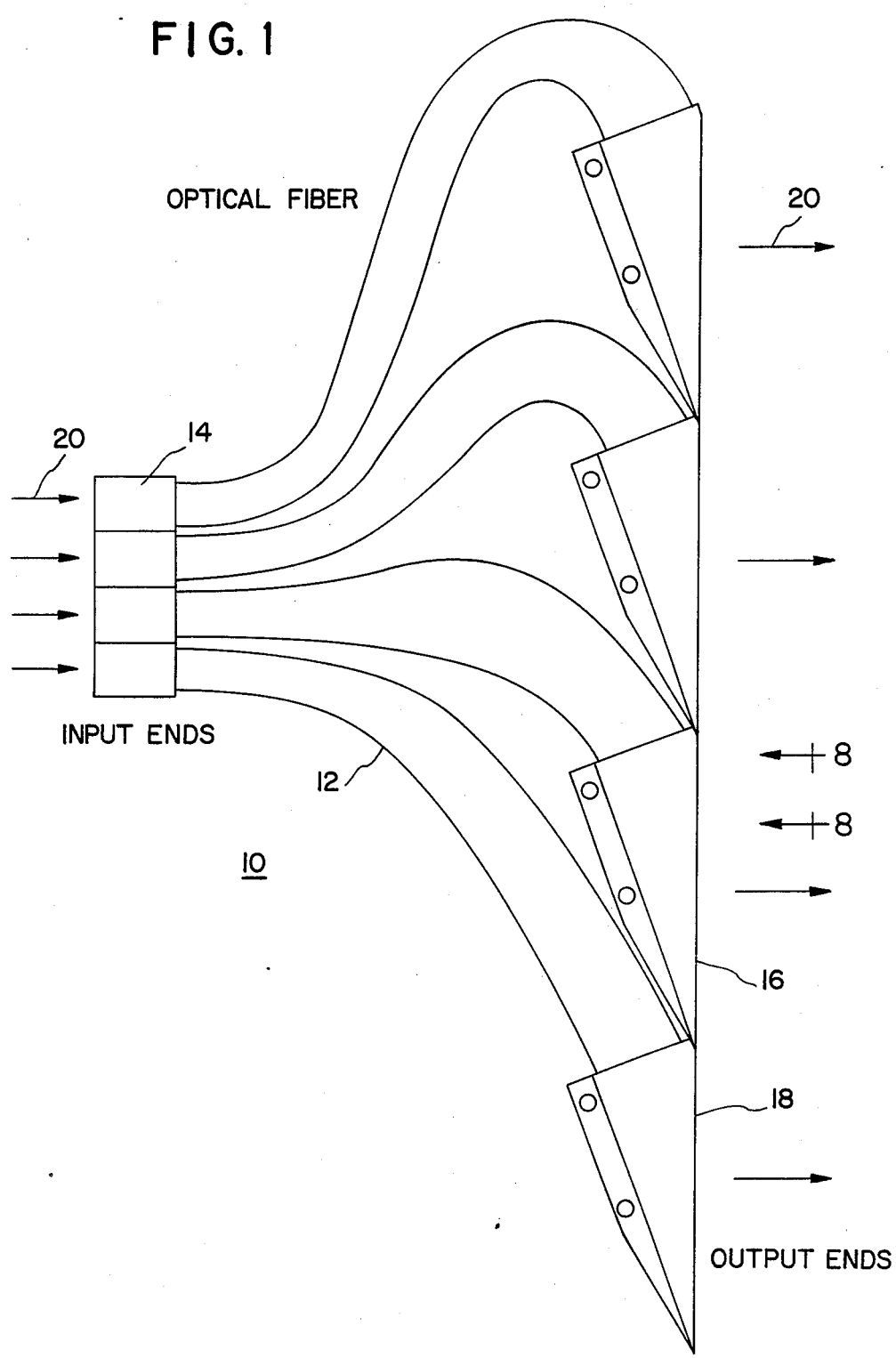
FIG. 1 is a partially schematic view of a fiber optic display that incorporates a presently preferred embodiment of this invention.

Turning now to the drawings, FIG. 1 shows a partially schematic side view of a fiber optic display 10. This display 10 is made up of an array of discrete optical fibers 12 which have input ends 14 and output ends 16. The output ends 16 are held in precise registration by spacers as described in detail below, and cooperate to form a display surface 18. The input ends 14 are likewise held in precise registration in a more closely packed arrangement. An optical image is incident into the input ends in the direction of the arrows 20, and the light is transmitted by the optical fibers 12 to the output ends 16 where it is emitted in the direction of the arrows 20 for viewing.

In general, such fiber optic displays are well known to those skilled in the art and no further detail is required in order adequately to illustrate the environment of the present invention. This invention is not limited to any specific type of fiber optic display, and the input end geometry in particular may be varied considerably. The input ends 14 may be rigidly positioned with respect to the output ends 16 as described in the Glenn patents referenced above. Alternately, the intermediate portions of the optical fibers may be of considerable length and may be flexible to allow adjustment between the positions of the input and output ends, as described in the above-identified Sedlmayr patent.

The present invention is directed to spacers used to hold the ends of the fibers in registration, and the following detailed description will focus on the structure and operation of these spacers.

Figure 2:
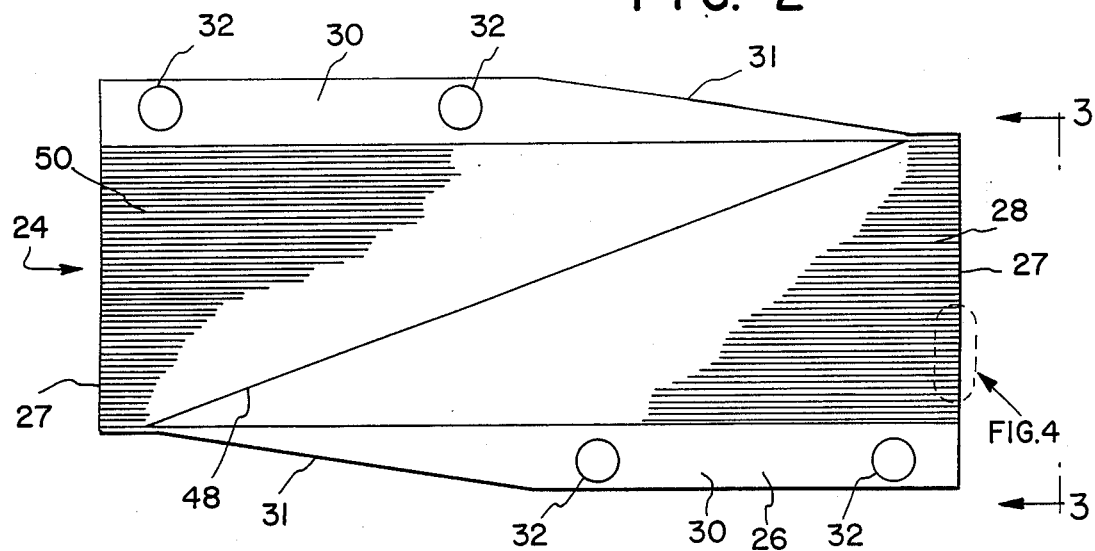
FIG. 2 is a top view of two of the spacers included in the embodiment of FIG. 1.
Figure 3:
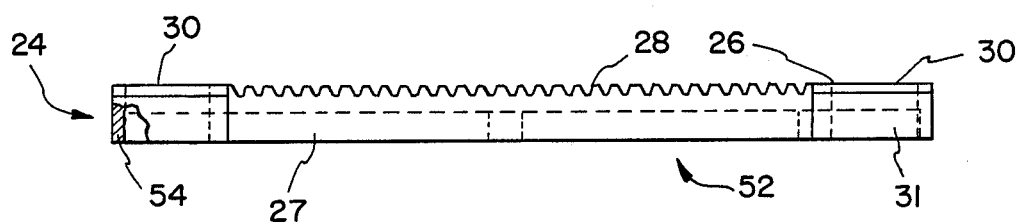
FIG. 3 is an end view taken along line 3—3 of FIG. 2.

FIG. 2 shows a pair of spacers 24 (prior to being severed from one another) which incorporate a presently preferred embodiment of this invention at an intermediate stage of assembly of the fiber optic display. Each spacer 24 is plate like in shape and defines opposed, parallel top and bottom surfaces 26, 52 as shown in FIG. 3. The top surface 26 defines an array of parallel grooves 28, and ungrooved surfaces 30 are positioned on either side of the array of grooves. Each end of the spacer 24 defines a respective end surface 27 positioned perpendicular to the grooves 28. A canted edge surface 31 bounds a part of the ungrooved surface 30 to allow closer spacing of the spacer assemblies as described below. Openings 32 are formed in each spacer 24 on the ungrooved surface 30, and these openings 32 can be used in mounting the finished assembly in place.

Figure 4:
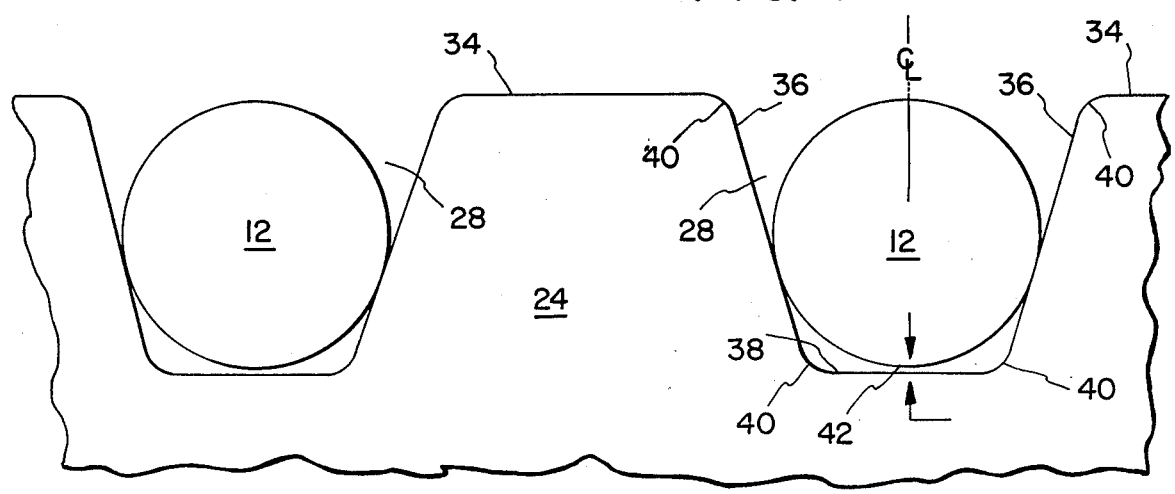
FIG. 4 is an enlarged end view of the encircled region of FIG. 2.

As shown in FIG. 4, each of the grooves 28 receives a respective one of the discrete optical fibers 12. In the finished display the output ends 16 of the optical fibers 12 are arranged in a matrix made up of a plurality of rows, each row having a plurality of fibers. In this context the term row is used to refer to the row of fibers secured to a single spacer 24, as shown at 50 in FIG. 7.

FIG. 4 is an enlarged view in the plane of FIG. 3 and is provided to illustrate the geometry of the grooves 28 in greater detail. As shown in FIG. 4 the grooves 28 are separated by lands 34. Each of the grooves 28 is made up of two side walls 36 and a bottom wall 38. In this embodiment the side walls 36 taper outwardly such that the groove 28 is trapezoidal in cross section with a greater width at a shallower portion of the groove than at a deeper portion of the groove. In this embodiment the corners 40 between the side walls 36 and the lands 34 and the bottom wall 38 are slightly rounded.

As shown in FIG. 4 the grooves 28 of this embodiment are carefully sized with respect to the fibers 12 such that the fibers 12 contact the side walls 36 before they contact the bottom wall 38. This elevates each of the fibers 12 slightly above the respective bottom wall 38, thereby maintaining a glue space 42.

Figure 6:
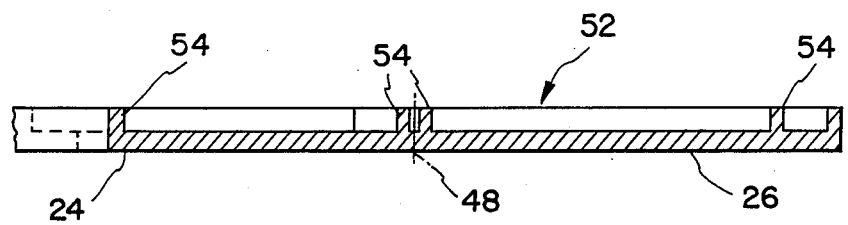
FIG. 6 is a sectional view taken along line 6—6 of FIG. 5, in which the grooves of the top surface have been deleted for clarity.
Figure 5:
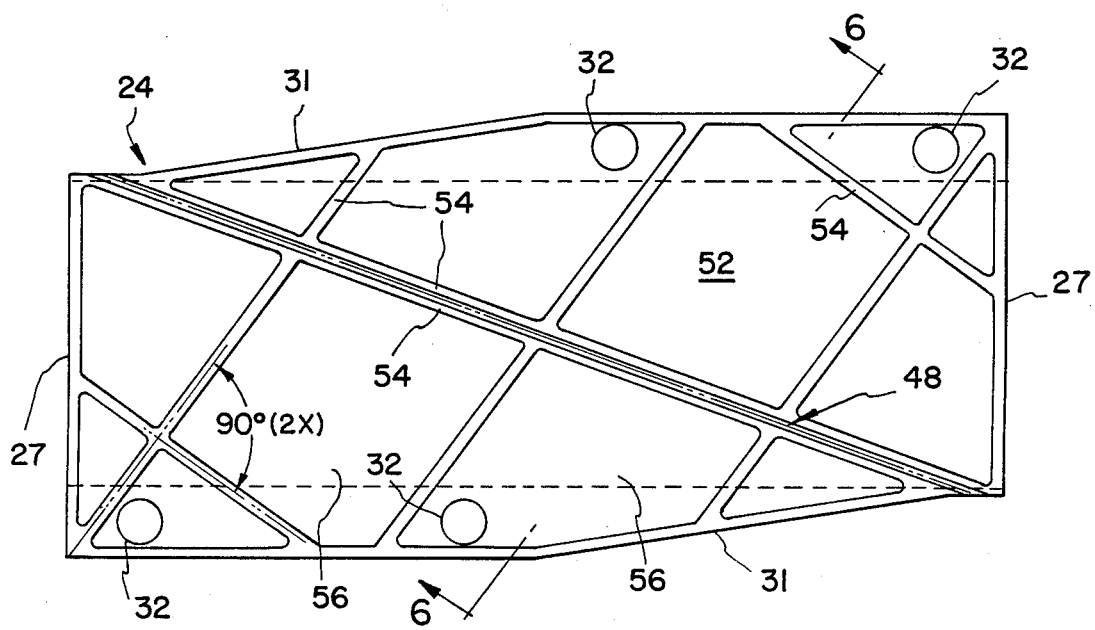
FIG. 5 is a bottom view of the spacers of FIG. 2.

FIG. 5 is a plan view of the bottom surface 52 of the spacers 24. Ribs 54 are positioned around the perimeter of each spacer 24 and at selected reinforcing positions. The depressions 56 between the ribs reduce the weight and material requirements of the spacers 24, as well as warping associated with material shrinkage. FIG. 6 shows how two of the ribs 54 are positioned on either side of the axis 48 described below.

FIG. 7 shows an end view of a plurality of the spacers 24 during an intermediate stage of fabrication of a spacer assembly. In general, a pair of spacers 24 is positioned, then a row 50 of fibers 12 is installed in the grooves 28 and glued in place. A next adjacent spacer 24 is then fixed in place over the row 50 of fibers 12 and the process is repeated until a spacer assembly containing the desired number of spacers is obtained. Adjacent spacers 24 are glued together to form a monolithic assembly.

Once the desired number of spacers 24 has been assembled together as described above, the spacer assembly is then cut into two parts along the axis 48 as shown in FIGS. 2 and 5. This axis 48 is disposed at an acute angle with respect to the grooves 28, in this embodiment 20°. In this way two identical spacer assemblies are formed, each defining a separate display surface 18. Standard grinding and polishing techniques can be used to provide the desired finish to the display surface.

FIG. 1 shows the manner in which these finished spacer assemblies can be arranged one adjacent to the next to form a large fiber optic display. The canted edge surfaces 31 provide an access path for optical fibers 12 emerging from the end surface 27 of the spacer assembly. FIG. 8 shows an enlarged view of a portion of the display surface 18. As shown in FIG. 8, the output ends 16 of the optical fibers 12 are elongated along the direction of the rows. The spacing between adjacent optical fibers 12 within a row is determined by the width of the lands 34, and the separation between adjacent optical fibers in the columns of the output ends 16 is determined by the thickness of the spacers 24.

The grooves 28 position the fibers precisely, in a manner that completely overcomes problems associated with accumulated dimensional errors or tolerances. Furthermore, the grooves are shaped to maintain a glue space to provide excellent bonding between the fibers and the side walls of the grooves, and to facilitate insertion of the optical fibers into the grooves.

Simply by way of illustration in order better to define the presently preferred embodiment of this invention, the following details of fabrication have been found suitable. In this embodiment each of the spacers 24 defines thirty parallel grooves 28. The optical fibers are 0.030 inches in diameter and the distance between center lines of adjacent fibers is 0.070 inches. The spacers 24 are preferably injection molded from polycarbonate such as that available from Fiberchem, Inc. as 300-15-77001 BLACK. In this embodiment each of the spacers 24 is 6.28 inches in length, 3 inches in width, and 0.200 inches in thickness. With respect to the geometry of the grooves 28, the presently preferred arrangement is to have each of the grooves 0.031 inches in depth, 0.040 inches in width at the side surface 28, with lands 0.030 inches in width. Preferably, the corners 40 have a radius of 0.005 inches, and the included angle between the bottom wall 38 and the side walls 36 is about 105°. This geometry leaves a typical glue space of 0.0005 inches, which has been found suitable. Thirty spacers of the type described above can be stacked to obtain a spacer assembly 6 inches in height.

A wide variety of materials can be used for the discrete optical fibers 12, but in this embodiment a material such as acrylic fiber is used. The optical fiber supplied by Mitsubishi as fiber CK-30 has been found suitable. Similarly, a wide variety of adhesives can be used to secure the fibers in the grooves, and to secure adjacent spacers together. However, in this embodiment, Master Bond EP 30 epoxy has been found suitable. Preferably the optical fibers are tensioned during assembly with a force of about one half pound per fiber, and the entire assembly is completed in less than 50 minutes to prevent the applied tension from damaging the fibers.

As pointed out above, the spacers 24 can be used in a wide variety of optical displays, including those in which the input ends are either rigidly or flexibly positioned with respect to the output ends. Of course, the size, spacing and other geometrical considerations can be varied as appropriate for the particular application. If desired, the lands may be varied in width within a single spacer to vary the lateral separation between selected pairs of adjacent fibers. Of course, the lands may be varied in width between spacers or between displays to obtain the desired separation between adjacent fibers in a row.

The assembly method set out above can be used as part of the Glenn method described in the above-identified Glenn patents. In this arrangement a central spacer such as a rotatable wheel is provided with fixtures for mounting two separate sets of spacers 24 at diametrically opposed positions on the wheel. At 90° with respect to these two sets of spacers other fixtures are provided to pack the input ends of the optical fibers 12 in a closely spaced array of rows and columns. Once the entire assembly has been completed, each of the spacer assemblies is cut at an acute angle as described above to provide two separate display surfaces 18, and each of the output end assemblies is severed as described in the Glenn patent to provide two separate output ends. In this way, four separate fiber optic displays are obtained. Of course, spiral winding methods similar to the Glenn method can be used to form any even number of separate fiber optic displays, and other winding techniques can be used to make single fiber optic displays. The spacer 24 is not limited to winding production methods, and can also be used in systems in which robotic arms pick up discrete fibers and place them in the grooves.

From the foregoing it should be apparent that an improved fiber optic display has been described that brings with it significant fabrication and structural advantages. It should be understood that the present invention is not limited to the foregoing specific example, and that a wide range of changes can be made to adapt the invention to particular applications. It is therefore intended that the foregoing detailed description be regarded as illustrative rather than limiting, and that it be understood that it is the following claims, including all equivalents, which are intended to define the scope of this invention.

I claim:

1. In a fiber optic display of the type comprising an array of optical fibers arranged in a matrix having a plurality of rows, each row having a plurality of discrete optical fibers, wherein said array of optical fibers has first and second ends, the improvement comprising:
   a plurality of spacers, each spacer defining an array of parallel grooves on one side thereof, each of said grooves sized to receive a respective one of said optical fibers such that the grooves of each spacer receive the optical fibers of a respective one of the rows, each of said grooves separated by a land having a width such that adjacent optical fibers in each row are laterally separated from one another by a distance no less than the width of the respective land;
   said optical fibers secured in said grooves with no more than one optical fiber in each groove such that the grooves position the optical fibers precisely with respect to one another in each row;
   said spacers secured together in aligned registration to form a surface aligned with the first ends of the optical fibers;
   said surface positioned at an acute angle with respect to said grooves such that the first ends are elongated in a direction extending along the rows.

2. The invention of claim 1 wherein the optical fibers are circular in cross section and the grooves are trapezoidal in cross section, with a greater width in a shallower part of the groove than in a deeper part of the groove.

3. The invention of claim 2 wherein each groove defines a bottom wall and a pair of side walls, and wherein the bottom wall defines an included angle of about 105° with each of the side walls.

4. The invention of claim 1 wherein each of the optical fibers defines a diameter, and wherein the width of each of the lands is substantially equal to the diameter.

5. The invention of claim 1 wherein each of the grooves defines a bottom wall and wherein at least some of the grooves are shaped to receive the optical fibers but to prevent the optical fibers from contacting the bottom wall, thereby maintaining a glue space between the fibers and the bottom walls.

6. The invention of claim 5 wherein each of the optical fibers defines a diameter, wherein each of the grooves defines a depth, and wherein the diameter is slightly less than the depth.

7. The invention of claim 1 wherein the acute angle is about 20°.

8. The invention of claim 1 wherein each of the spacers defines a bottom side of the spacer opposed to the groove bearing side, and wherein the bottom side defines an array of ribs separated by recesses.

* * * * *